United States Patent [19]

Princell

[11] Patent Number: 4,548,434
[45] Date of Patent: Oct. 22, 1985

[54] LATCH FOR REMOVABLE VEHICLE ROOF PANELS

[76] Inventor: William E. Princell, 10803 Wildwood Dr., Indianapolis, Ind. 46256

[21] Appl. No.: 416,881

[22] Filed: Sep. 13, 1982

[51] Int. Cl.$^4$ .............................................. E05C 3/08
[52] U.S. Cl. ............................ 292/223; 292/DIG. 5
[58] Field of Search .............. 292/7, 39, 223, DIG. 5, 292/251; 70/19, 210, 215, 216, 217, 209

[56] References Cited

U.S. PATENT DOCUMENTS

| | | | |
|---|---|---|---|
| 3,600,912 | 8/1971 | Foreman | 70/77 |
| 4,095,445 | 6/1978 | Storlie et al. | 70/215 |
| 4,193,618 | 3/1980 | Lee et al. | 292/39 X |
| 4,366,683 | 1/1983 | Lablié et al. | 70/19 |
| 4,428,609 | 1/1984 | Baehr | 292/251 |

Primary Examiner—Richard E. Moore
Attorney, Agent, or Firm—Barnes & Thornburg

[57] ABSTRACT

A latch assembly for removable vehicle roof panels includes a handle for selectively releasably retaining the panel on the vehicle. A bracket pivotally mounts the handle and a first locking member on the panel. The handle is movable between a first latching orientation in which the panel is secured to the vehicle and a second non-latching orientation in which the panel is removable from the vehicle. A second locking member, provided on the handle, cooperates with the first to lock the handle in the latching orientation. The second locking member is key-actuable to be moved out of locking cooperation with the first to permit movement of the handle to the non-latching orientation.

10 Claims, 6 Drawing Figures

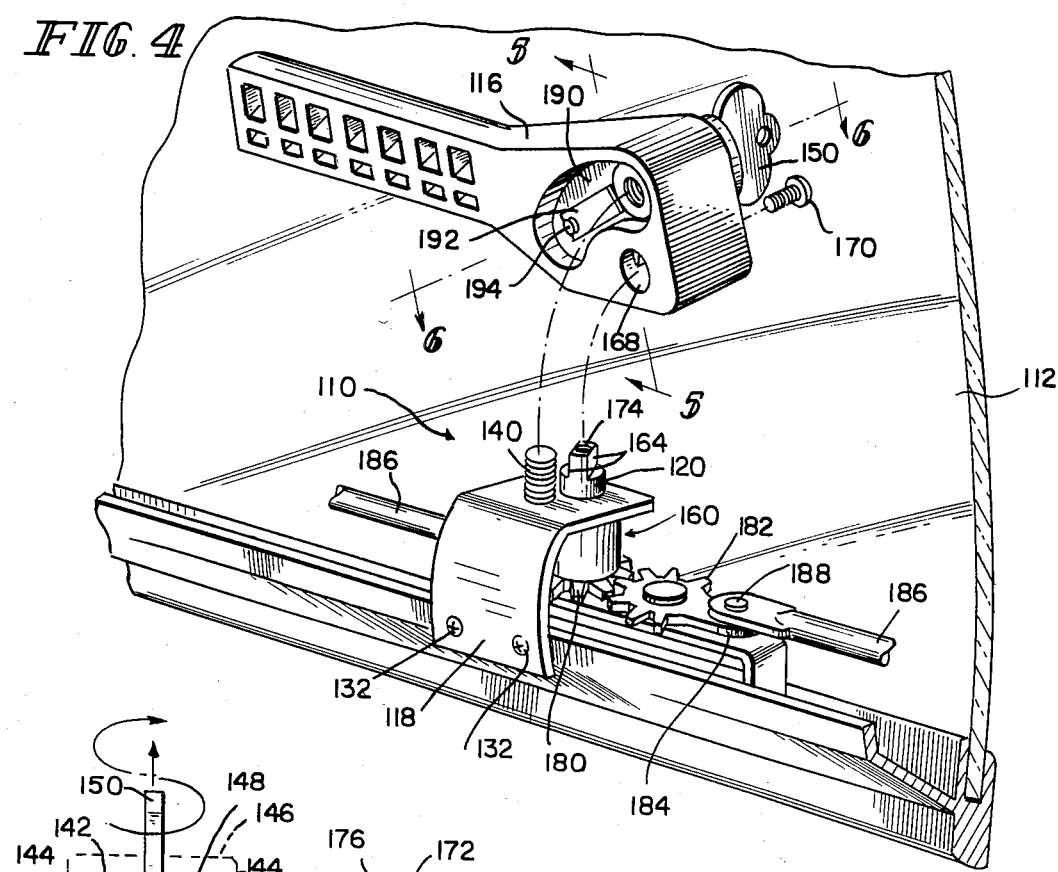
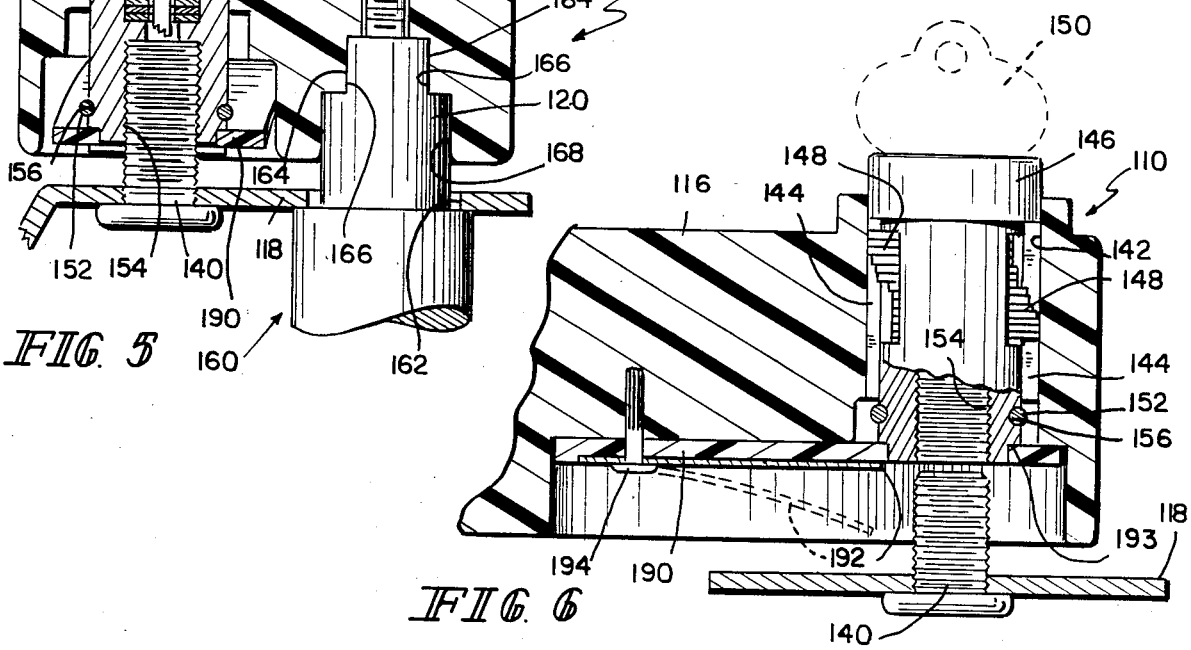

LATCH FOR REMOVABLE VEHICLE ROOF PANELS

This invention relates to latching devices, and more specifically to latching systems for removable or retractable roof panels for automobile and other vehicle tops.

Devices and systems for mounting removable roof panels to automobiles and other vehicles are known. There are, for example, the systems disclosed in U.S. Pat. Nos. 4,223,943; 3,913,970; 4,220,368; 4,043,590; 3,993,348; 3,603,636; 4,302,045; 4,101,161; and 3,402,511.

Key-operated screw-type locks are also known. There is, for example, the screw-type shutter lock assembly illustrated in U.S. Pat. No. 3,600,912.

So-called "T-tops" and "sun roof" tops are now available on many automobiles. The sun roof or T-top option is becoming more and more popular, and has given rise to considerable theft of removable roof panels. Originally, such panels were available only in solid opaques. More recently, however, the panels have been available in transparent or translucent, tinted and untinted materials. Many of the transparent panels available on newer automobiles fit some of the older automobiles, and make it desirable for owners of older automobiles to obtain the new roof panels. Since the panels cost as much as $500 or more per panel, a considerable "black market" has arisen. Since the panels have no serial numbers or other identifying indicia on them when the car comes from the factory, stolen panels are frequently difficult, if not impossible, to trace.

It is an object of the present invention to provide a locking latch mechanism for removable vehicle roof panels.

According to the invention, a latch assembly for a removable vehicle roof panel comprises a handle for selectively releasably retaining the panel on the vehicle, means for mounting the handle for movement between a first latching orientation in which the panel is secured to the vehicle, and a second non-latching orientation in which the panel is removable from the vehicle, a first locking member and a second locking member. The second locking member cooperates with the first to secure the handle in the first orientation. The second locking member is operable to permit movement of the second locking member out of locking cooperation with the first to permit the handle to be moved from the first orientation to the second.

Illustratively, according to the present invention, a means for mounting the handle comprises means for mounting the handle and the first locking member from the panel. Illustratively, the assembly further comprises means for mounting the second locking member from the handle. The first locking member comprises a threaded stud.

Additionally, according to the illustrative embodiments, the handle comprises means defining a generally right circular cylindrical aperture having at least one lug projecting from the cylindrical interior wall thereof, and the second locking member comprises a key-actuable lock plug having tumblers which engage the lug when the key is not inserted into it. Insertion of the key retracts the tumblers from lug engagement and permits rotation of the plug. The second member further includes means providing a threaded passageway for selectively engaging the threaded stud, rotation of the plug driving the means providing the threaded passageway selectively into and out of engagement with the threaded stud.

The invention may best be understood by referring to the following description and accompanying drawings which illustrate the invention. In the drawings:

FIG. 4 is a fragmentary and partly exploded perspective view of the underside (headliner side) of a combination roof panel and latch assembly according to another embodiment of the invention;

FIG. 5 is a fragmentary sectional view of the combination roof panel and latch assembly of FIG. 4, taken generally along section lines 5—5 of FIG. 4; and FIG. 6 is a fragmentary sectional view of the combination roof panel and latch assembly of FIG. 4, taken generally along section lines 6—6 of FIG. 4.

Figure 1:
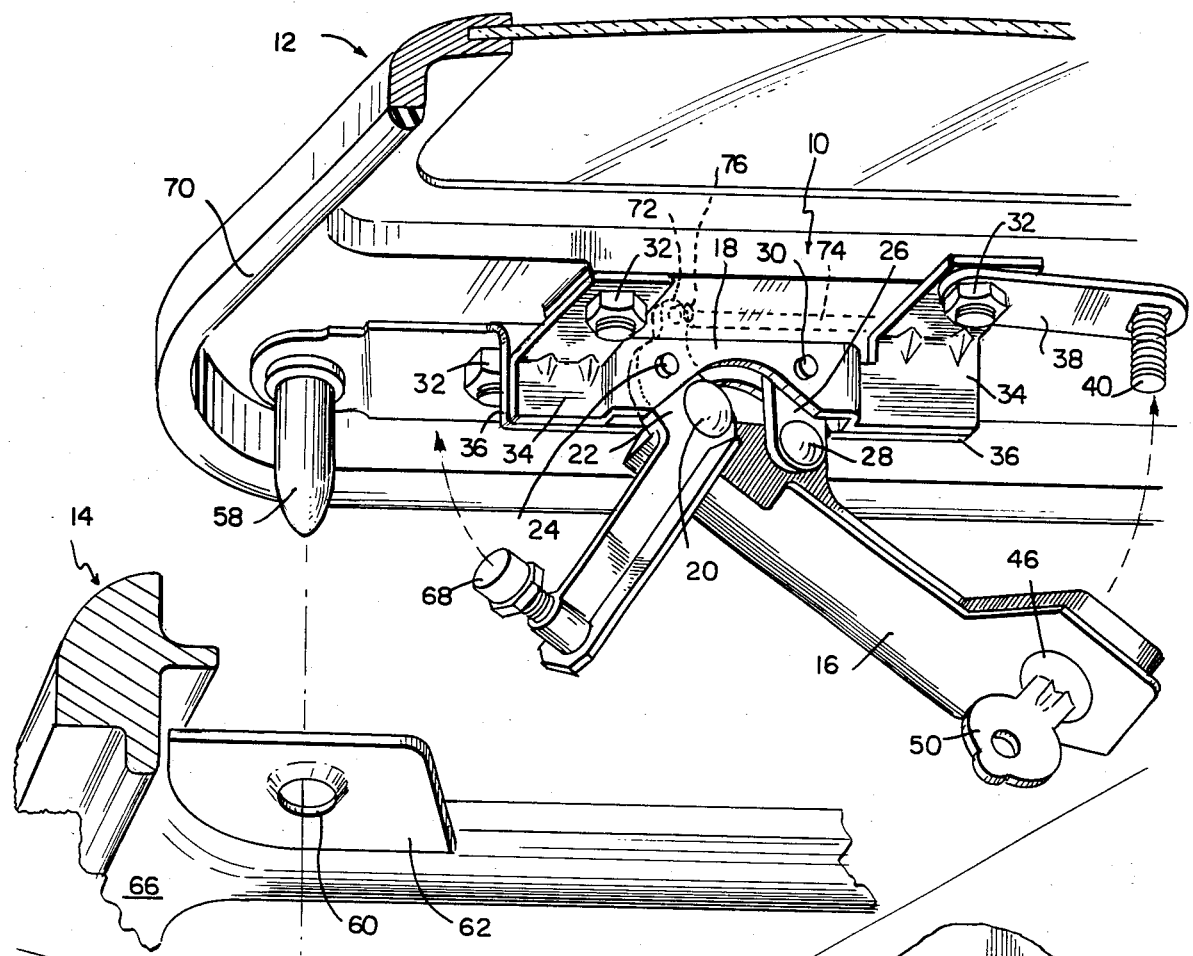
FIG. 1 is a longitudinal sectional perspective view of a vehicle roof panel and associated components of the vehicle with a latch assembly according to the present invention installed, the latch assembly and roof panel being illustrated in their panel-removal orientations.
Figure 2:
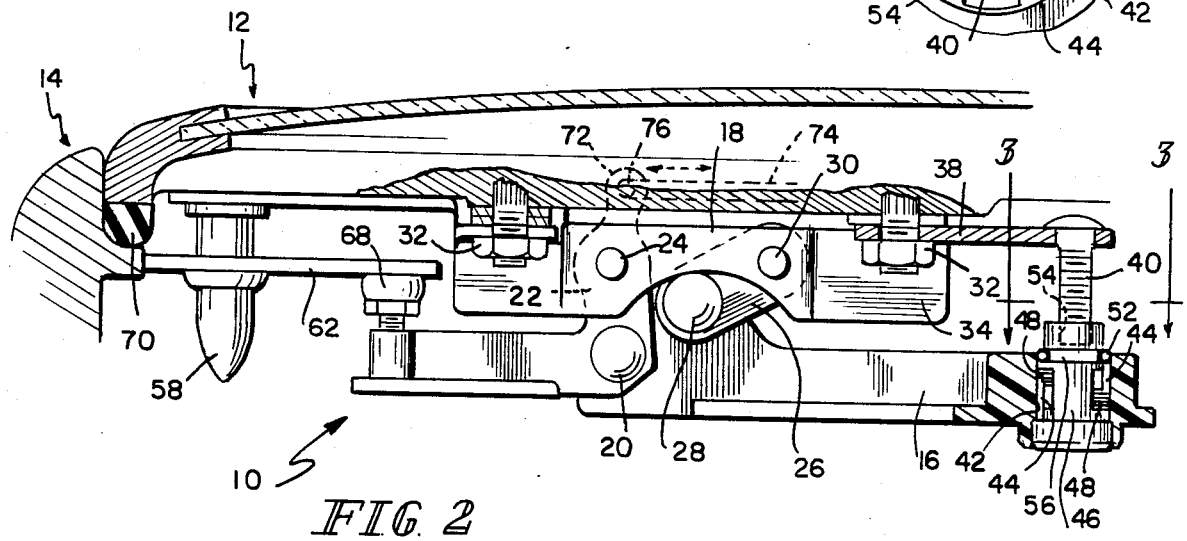
FIG. 2 is a sectional side elevational view of the portions of the automobile illustrated in FIG. 1, but with the roof panel and latch assembly being illustrated in their panel-locking or non-removal orientations.

Turning now to FIGS. 1 and 2, a latch assembly 10 for a removable vehicle roof panel 12, illustratively a roof panel of a Corvette automobile, releasably retains the panel 12 to the vehicle top between the vehicle windshield header 14 and the rear portion of the top (not shown). The latch assembly 10 includes a handle 16 and a bracket 18 from which the handle 16 is mounted for movement between a first roof panel latching orientation, illustrated in FIG. 2, and a second roof panel-removal or non-latching orientation, illustrated in FIG. 1. The handle 16 is movably attached to the bracket 18 through a pivotal mounting 20 to a lever 22 which itself is pivotally mounted at 24 to bracket 18. A second lever 26 is pivotally mounted at 28 to handle 16 rearwardly of pivotal mounting 20. Second lever 26 is pivotally mounted to bracket 18 as illustrated at 30. Bracket 18 is mounted to the removable vehicle roof panel 12 by studs and nuts 32. In the mechanism illustrated in FIGS. 1 and 2, levers 22, 26 are sandwiched between two bracket 18 portions 34, 36 which are spot-welded or otherwise joined beyond the limits of motion of levers 22, 26. An extension 38 is attached to bracket 18 by one of nuts 32. Extension 38 provides at its end remote from bracket 18 a threaded stud 40 which serves as a first locking member. In this embodiment, the threaded stud 40 is actually a carriage bolt, as best illustrated in FIG. 2.

Figure 3:
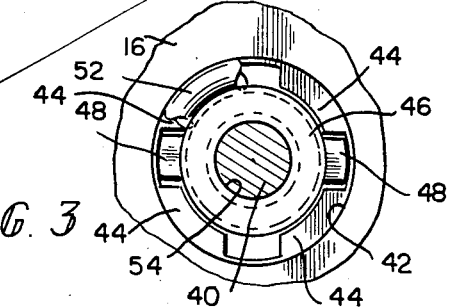
FIG. 3 is a detail of the latch assembly illustrated in FIGS. 1 and 2, taken generally along section lines 3—3 of FIG. 2.

Handle 16 is provided with a generally right circular cylindrical aperture 42 at its end remote from pivots 20, 28. As best illustrated in FIGS. 2 and 3, the generally right circular cylindrical wall of aperture 42 is provided with four radially inwardly projecting lugs 44. A key plug 46 is insertable into aperture 42 and provides a second locking member which cooperates with stud 40 to lock handle 16 in its roof panel 12 latching or non-removal orientation, illustrated in FIG. 2. Specifically, plug 46 is provided with tumblers 48 which engage in the spaces between lugs 44 with tumblers 48 which engage in the spaces between lugs 44 and prevent rotation of plug 46 when a key 50 (FIG. 1) is removed from the plug 46. When the key 50 is inserted into the plug 46, the tumblers 48 disengage the lugs 44. This permits rotation of the plug 46 either to engage or to disengage a threaded passageway 54 from stud 40, alternatively preventing or permitting movement of handle 16 to its non-latching orientation. A snap-ring 52 in a groove 56 on plug 46 maintains plug 46 in the aperture 42.

The forward region of bracket 18 is provided with a locator pin 58. An aperture 60, sized to receive locator pin 58, is provided in a web 62 fixed in the region defined by the windshield header 14 and windshield corner post 66. A resilient pad 68 is adjustably mounted on the end of lever 22 remote from pivotal mounting 20. Placement of the locator pin 58 in the aperture 60 and movement of the handle 16 to the latching or non-removal orientation brings the resilient pad 68 into contact with the underside of web 62. Rotation of the plug 46 causes the stud 40 to engage in the threaded passageway 54, compresses the resilient pad, and compresses the weather gasket 70 on roof panel 12 into a groove provided therefor in windshield header 14. Lever 22 is also provided with an ear 72 above pivot 24. A rear panel 12 locating rod 74 is operated contemporaneously with lever 22 by pivotal engagement 76 of rod 74 with ear 72.

Turning now to the embodiment of the invention illustrated in FIGS. 4-6, a latch assembly 110 for a removable vehicle roof panel 112 releasably retains the panel 112 to the vehicle top between the vehicle windshield header (not shown) and the rear portion of the top (not shown). The latch assembly 110 includes a handle 116 and a bracket 118 from which the handle 116 is mounted for movement between a first roof panel latching orientation, illustrated in FIG. 5, and a second roof panel-removal or non-latching orientation, illustrated in FIG. 6. The handle 116 is movably attached to the bracket 118 through a pivotal mounting 120 on bracket 118. Bracket 118 is mounted to the removable vehicle roof panel 112 by screws 132. A threaded stud 140 serves as a first locking member. Stud 140 is attached to bracket 118, e.g., by welding.

Handle 116 is provided with a generally right circular cylindrical aperture 142 adjacent the pivotal mounting 120. As best illustrated in FIGS. 5 and 6, the generally right circular cylindrical wall of aperture 142 is provided with four radially inwardly projecting lugs 144. A key plug 146 is insertable into aperture 142 and provides a second locking member which cooperates with stud 140 to lock handle 116 in its roof panel 112 latching or non-removal orientation, illustrated in FIG. 5. Specifically, plug 146 is provided with tumblers 148 which engage in the spaces between lugs 144 and prevent rotation of plug 146 when a key 150 is removed from the plug 146. When the key 150 is inserted into the plug 146, the tumblers 148 disengage the lugs 144. This permits rotation of the plug 146 either to engage or to disengage a threaded passageway 154 from stud 140, alternatively preventing or permitting movement of handle 116 to its non-latching orientation. A snap-ring 152 in a groove 156 on plug 146 maintains plug 146 in the aperture 142.

The pivot 120 is provided by a post 160 which protrudes through an aperture 162 in bracket 118. Handle 116 is coupled to the post 160 for movement with the post by chordal flats 164 on the end of post 160 and corresponding flats 166 molded into the opening 168 of handle 116 which receives the post 160 end. A screw 170 with a washer 172 screws into a threaded opening 174 in the end of post 160 to lock the handle 116 on the post. A trim cap 176 snaps onto washer 172 to reduce the likelihood of tampering with screw 170 and possible handle 116 removal. Rotation of handle 116 about pivot 120 thus results in rotation of post 160 and a spur gear 180 at the opposite end of post 160. Gear 180 engages two other spur gears 182, one of which is illustrated in FIG. 4. Each gear 182 includes a crank arm 184 to which a panel 112 locating and locking rod 186 is pivotally attached at 188. When handle 116 is in the panel 112 latching or non-removal orientation, the tapered distal ends (not shown) of rods 186 project into openings provided therefor in the vehicle windshield header (not shown) and the vehicle roof (not shown) behind the opening covered by the panel.

Some axial movement of the plug 146 is necessary in this embodiment since the handle 116 swings in a plane which intersects threaded stud 140, rather than away from stud 140 as in the embodiment of FIGS. 1-3. This axial movement is provided by locating the snap ring 152 near the end of the plug 146. To prevent interference between the end of the plug 146 and the stud 140 as the handle 116 pivots, the plug 146 is spring-urged into its projected position illustrated in broken lines in FIG. 5 by engagement of a combination resin and metal leaf spring 190, 192 with a shelf 193 provided at the end of plug 146. The strips 190, 192 of plastic resin and metal are attached to the body of handle 116 by a rivet 194. The metal strip 192 reduces wear on the plastic strip 190 which otherwise might occur by virtue of the end of stud 140 encountering strip 190 as the handle 116 is pivoted. Metal strip 192 also prevents plastic strip 190 from retaining the bent orientation that it assumes when the plug 146 is placed in the locking orientation, illustrated in FIG. 5.

What is claimed is:

1. A latch assembly for removable vehicle roof panels comprising a handle for selectively releasably retaining the panel on the vehicle, means for mounting the handle upon the panel for movement between a first latching orientation for securing the panel to the vehicle and a second non-latching orientation in which the panel is removable from the vehicle, a first locking member, means for mounting the first locking member upon the panel, a second locking member, the second locking member cooperating with the first to secure the handle in the first orientation, the second locking member being operable to permit movement of the second locking member out of locking cooperation with the first locking member to permit the handle to be moved from the first orientation to the second, means for mounting the second locking member upon the handle, the first locking member comprising a threaded stud, the handle comprising means defining a generally right circular cylindrical aperture having at least one lug projecting from the cylindrical interior wall thereof and the second locking member comprising a key-actuable lock plug having tumblers which engage the lug when the key is not inserted into it, insertion of the key retracting the tumblers from lug engagement and permitting rotation of the plug, and means providing a threaded passageway for selectively engaging the threaded stud, rotation of the plug driving the means providing the threaded passageway selectively into and out of engagement with the threaded stud.

2. The assembly of claim 1 wherein the means for mounting the handle upon the panel comprises a bracket, the bracket including means for pivotally supporting the handle.

3. The assembly of claim 1 wherein the means for mounting the handle upon the panel comprises a bracket, a lever, means for pivotally mounting the lever from the bracket, and means for pivotally mounting the handle from the lever.

4. The assembly of claim 3 and further comprising a second lever, means for pivotally mounting the second lever from the bracket, and means for pivotally mounting the handle from the second lever.

5. The assembly of claim 1 and further comprising means for driving a panel-locating rod operating lug and means for coupling the locating rod operating lug to the handle for operation by the handle.

6. A latch assembly for removable vehicle roof panels comprising a handle for selectively releasably retaining the panel on the vehicle, means for mounting the handle upon the panel for movement between a first latching orientation for securing the panel to the vehicle and a second non-latching orientation in which the panel is removable from the vehicle, a first locking member, means for mounting the first locking member upon the panel, a second locking member, means for mounting the second locking member to the handle, the second locking member cooperating with the first to secure the handle in the first orientation, the second locking member being operable to permit movement of the second locking member out of locking cooperation with the first locking member to permit the handle to be moved from the first orientation to the second, the first locking member including a threaded stud, the handle including means defining a generally right circular cylindrical aperture having at least one lug projecting from the cylindrical interior wall thereof and the second locking member including a key-actuable lock plug having tumblers which engage the lug when the key is not inserted into it, insertion of the key retracting the tumblers from the lug engagement and permitting rotation of the plug, and means providing a threaded passageway for selectively engaging the threaded stud, rotation of the plug driving the means providing the threaded passageway selectively into and out of engagement with the threaded stud.

7. The assembly of claim 6 wherein the means for mounting the handle upon the panel comprises a bracket, the bracket including means for pivotally supporting the handle.

8. The assembly of claim 6 wherein the means for mounting the handle upon the panel comprises a bracket, a lever, means for pivotally mounting the lever upon the bracket, and means for pivotally mounting the handle upon the lever.

9. The assembly of claim 8 and further comprising a second lever, means for pivotally mounting the second lever upon the bracket, and means for pivotally mounting the handle upon the second lever.

10. The assembly of claim 6 and further comprising means for driving a panel-locating rod operating lug and means for coupling the locating rod operating lug to the handle for operation by the handle.

* * * * *